United States Patent
Battlogg et al.

(10) Patent No.: US 10,941,601 B2
(45) Date of Patent: Mar. 9, 2021

(54) DOOR COMPONENT COMPRISING A CONTROLLABLE DAMPING SYSTEM

(71) Applicant: INVENTUS ENGINEERING GMBH, St. Anton I.M. (AT)

(72) Inventors: Stefan Battlogg, St. Anton I.M. (AT); Markus Mayer, Sulz (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 202 days.

(21) Appl. No.: 15/746,503

(22) PCT Filed: Jul. 21, 2016

(86) PCT No.: PCT/EP2016/067473
§ 371 (c)(1),
(2) Date: Apr. 18, 2018

(87) PCT Pub. No.: WO2017/013234
PCT Pub. Date: Jan. 26, 2017

(65) Prior Publication Data
US 2018/0216693 A1    Aug. 2, 2018

(30) Foreign Application Priority Data

Jul. 21, 2015  (DE) ..................... 10 2015 009 449.1
Nov. 11, 2015  (DE) ..................... 10 2015 119 505.4

(51) Int. Cl.
*F16F 9/53*     (2006.01)
*E05C 17/00*    (2006.01)
(Continued)

(52) U.S. Cl.
CPC ............ *E05F 5/025* (2013.01); *E05C 17/003* (2013.01); *E05C 17/006* (2013.01); *E05F 15/00* (2013.01);
(Continued)

(58) Field of Classification Search
CPC ......... E05F 15/619; E05F 15/00; E05F 5/025; E05F 5/00; E05C 17/006; E05C 17/22;
(Continued)

(56) References Cited

U.S. PATENT DOCUMENTS 5,468,042 A * 11/1995 Heinrichs ............. E05C 17/305
16/51
6,314,612 B1 11/2001 Rennecke et al.
(Continued)

FOREIGN PATENT DOCUMENTS

CN    203867356 U    10/2014
DE    19754167 A1    6/1999
(Continued)

*Primary Examiner* — Joseph D. Pape
*Assistant Examiner* — Dana D Ivey
(74) *Attorney, Agent, or Firm* — Laurence A. Greenberg; Werner H. Stemer; Ralph E. Locher (57) ABSTRACT

A method for damping a movement of a door system of a vehicle that is equipped with a damping system having an adjustable and controllable damping action. A movement of the door system between a closed position and an open position is damped in a controlled manner. A measurement of the change in speed of the speed of movement of the door system is calculated and if the change in speed exceeds a predefined limit value, a set, gentle damping action is changed over to a greater damping action.

19 Claims, 4 Drawing Sheets

(51) Int. Cl.
*E05C 17/22* (2006.01)
*E05F 5/02* (2006.01)
*F16D 57/00* (2006.01)
*F16F 9/06* (2006.01)
*F16F 9/18* (2006.01)
*E05F 15/00* (2015.01)
*E05F 15/619* (2015.01)

(52) U.S. Cl.
CPC .......... *E05F 15/619* (2015.01); *F16D 57/002* (2013.01); *F16F 9/067* (2013.01); *F16F 9/187* (2013.01); *F16F 9/535* (2013.01); *E05Y 2201/21* (2013.01); *E05Y 2201/254* (2013.01); *E05Y 2201/264* (2013.01); *E05Y 2400/21* (2013.01); *E05Y 2900/531* (2013.01)

(58) Field of Classification Search
CPC ......... E05C 17/003; F16F 9/535; F16F 9/067; F16F 9/187; F16F 9/20; F16F 9/56; F16F 9/537; F16F 9/3292; F16F 9/06; F16F 9/063; F16F 2222/06; F16F 2222/12; F16F 2224/045; F16F 2230/0005; F16F 2230/0088; F16F 2230/18; F16D 57/02; F16D 57/06; F16D 71/00; B60J 5/047; E05Y 2201/264; E05Y 2201/21; E05Y 2201/254; E05Y 2201/462; E05Y 2201/218; E05Y 2201/232; E05Y 2201/256; E05Y 2201/246; E05Y 2201/46; E05Y 2201/434; E05Y 2400/21; E05Y 2400/20; E05Y 2400/44; E05Y 2400/45; E05Y 2400/53; E05Y 2400/54; E05Y 2900/531
USPC ..................................................... 296/146.11
See application file for complete search history.

(56) References Cited

U.S. PATENT DOCUMENTS 7,438,346 B1 * 10/2008 Breed .................. E05C 17/203
296/146.12
9,273,747 B2 3/2016 Walthert et al.
2006/0181108 A1 8/2006 Cleland et al.
2008/0307711 A1 12/2008 Kern et al.

FOREIGN PATENT DOCUMENTS

DE 102013014091 A1 3/2015
EP 0580147 A1 1/1994
WO WO-2004001170 A1 * 12/2003 ........... E05C 17/305

* cited by examiner

DOOR COMPONENT COMPRISING A CONTROLLABLE DAMPING SYSTEM

BACKGROUND OF THE INVENTION

Field of the Invention

The present invention relates to a door component having a controllable damper device, in particular for a motor vehicle. Here, the door component comprises two connector units which are movable relative to one another, the movement of which relative to one another can be at least braked by means of at least one controllable damper device. Here, one of the two connector units is connectable or connected to a supporting structure, and the other of the two connector units is connectable or connected to a pivotable door device, and in particular a vehicle door.

In the prior art, a wide variety of door components has become known with which targeted damping of the door movement and in particular also targeted fixing of the door in predetermined angular positions is possible. Normally, for this purpose, use is made of mechanical systems which are inexpensive and which allow the door of a motor vehicle to be secured in two or three angular positions. In this way, the user can move the door into one of the angular positions that appears suitable owing to the present space situation, and can exit the automobile.

A disadvantage of said known mechanical systems is however that the door is fixed only in a certain number of defined angular positions. If there is presently less or even more space available, it may be the case that there is no suitable position.

Active systems have also become known in which the door can basically be braked or fixed in any desired positions. A disadvantage of systems actuated for example by means of a spindle is that these require a relatively long time for the opening or closing of the doors. Systems have also become known which have for example a magnetorheological brake, and in the case of which an electrical coil generates a magnetic field in order to achieve the desired damping action. A disadvantage of such systems is that electrical energy is always required during the imparting of the damping action, which may entail considerable energy consumption for example during a relatively long stoppage in a parking space, for example, with a door open.

A system has also become known in which the magnetic field required for the damping action is generated by means of a permanent magnet. A considerable advantage of this system consists in that the energy consumption is low. It is however a disadvantage that, for example in the event of an accident and a failure of the electrical systems, the door can be moved only with very high force, because a high damping action is generated by means of the permanent magnet. This may be a problem specifically if elderly persons or children are seated in the automobile and they can open the door only with difficulty, or possibly cannot open the door at all.

During closing processes of automobile doors, it is possible for objects to become trapped between the door and the frame. For example, in an inclined position, the door may fall closed of its own accord as a result of a gust of wind. If a sensitive object is now situated between the door and the frame, this may be damaged or even destroyed. An even worse situation may arise if a body part becomes trapped here. This may lead to painful injuries and bruises or even fractures. To prevent body parts from becoming trapped, it is conceivable to use active sensor systems which constantly monitor the intermediate space when the door is open and correspondingly control the door damping.

Disadvantages of this are however that complex evaluation of measurement data from various sensors is necessary, and that, in the case of sensors being obstructed or restricted in terms of their viewing angle, it is also possible for objects or body parts to be "overlooked", and therefore such incidents cannot be prevented with adequate reliability, specifically because such a function may also lead to greater carelessness and less attentiveness.

SUMMARY OF THE INVENTION

It is therefore the object of the present invention to provide a door component and a method, with which an at least partially improved door component with improved safety during opening and/or closing, in particular for a motor vehicle, can be provided. It is desirable here to increase the safety without great outlay.

Said object is achieved by means of a method having the features as claimed and by means of a device having the features as claimed. The dependent claims relate to preferred refinements of the invention. Preferred features, refinements and embodiments will also be discussed in the general description and in the description of the exemplary embodiments.

A method according to the invention is used for damping a movement or pivoting movement of a door device, in particular of a vehicle, and is carried out using a damper device having a settable and controllable damping action. Here, a movement of the door is damped in controlled fashion at least partially between a closed position and an open position. Here, a measure for a rate of change of the movement speed and/or rotational speed of the door device is determined, and, in the event of a rate of change beyond a predetermined threshold value, a switch is made from a presently set relatively low damping action to a relatively high damping action.

The method according to the invention has numerous advantages. The method permits considerably safer operation of a door component. Serious injuries to body parts and major damage to objects can be substantially prevented.

Here, the rate of change of the rotational speed is to be understood to mean the mathematical derivation of the rotational speed, that is to say the acceleration or the deceleration. This means that, in the event of an excessive change in the rotational speed, the controller intervenes in the damping characteristic of the damper device. Here, the mathematical magnitude of the rate of change is taken into consideration. The threshold values for deceleration and acceleration during both opening and closing may be equal, though preferably differ.

The method makes it possible for a relatively high damping action to be set practically immediately in the event of an intense deceleration of the door, in order to as far as possible prevent or at least reduce or minimize damage. For example, if a pivotable door of a motor vehicle is moved in a closing direction as a result of a gust of wind or as a result of some other action, and if for example a leg or a hand or some other object is situated in the path of the closing movement, then the door initially—without further sensors—strikes the object and is unexpectedly braked in the process. This means that, for example in the case of a relatively high rotational speed of the door, an unexpected change in the rotational speed occurs. This means here that the rate of change of the rotational speed exceeds a predetermined threshold value. The invention now makes it possible, in the event of such a process being detected, for a relatively high (and in particular maximum) damping action to be set immediately in the event of such a process being identified, such that damage can altogether possibly be avoided entirely, or at least considerably reduced.

For example, during the opening of the door, the door may strike with the flat body panel against a for example blunt obstruction, which immediately considerably reduces the rotational speed of the door. Since, however, the body panels can generally deform resiliently elastically over a small range, it is thus possible, in the case of an immediate action, for damage to the door to possibly be prevented entirely.

This means that the deceleration of the door is preferably determined and that in the case of a deceleration of the rotational speed beyond a predetermined threshold value, the damping is switched from a low or relatively low value to a high or relatively high damping action. For this purpose, it is the case in particular that the speed or the rotational speed of the door is monitored.

In all embodiments, during the closing process, it is for example possible in all cases for the door to be braked when a small angle or gap is reached, in order to achieve in this way a smooth or soft closing action. Such a small angle can be for example 15° or 10° or 5°. A corresponding gap can be 20 mm, 10 mm, 5 mm or even only 1 mm. In the case of sensor-based identification of obstructions, braking can also already be correspondingly performed in advance.

In preferred refinements, the damping is preferably set as quickly as possible to a substantially maximum value or to the maximum value if the rate of change or deceleration exceeds the predetermined threshold value. Damage or injury can thereby be particularly effectively reduced or prevented.

In particular if a magnetorheological damping valve of the damper device is used, it is thus possible to achieve a very fast reaction of the system. Magnetorheological damper devices can completely change their setting within a few milliseconds, such that a time period of only a few milliseconds elapses from a state of minimum damping to a state of maximum damping. This means that, during actual closing movements, the door can be fully braked within less than 5 mm and in particular less than 2 mm and preferably less than 1 mm and, in advantageous embodiments, in approximately 0.6 mm. In the case of such rapid braking processes, it is possible in many cases to avoid considerable damage, even if the user jams for example implements or objects such as computers, or a body part such as a finger, a hand or other limbs, in the door.

The damping action is preferably increased when the door approaches at least one predetermined position and, in particular, angular position. This may for example be a predetermined open position. The damping action is preferably increased when the door approaches the closed position. For example, at a particular angular value of 15°, 10° or 5° or corresponding gap size, the damping may be intensified to such an extent that continuous and gradual braking is realized.

The damping action is preferably increased such that the movement speed or rotational speed of the door during a closing movement is reduced to a predefined closing speed.

The closing speed is in particular predefined such that smooth closing is performed, with preferably little generation of noise.

In all embodiments, it is preferable for at least one learning function to be integrated, with which closing speeds during closing processes are evaluated. In this way, the predefined closing speed is preferably adapted if it is found that, during preceding closing processes, the door was no longer moving sufficiently quickly for a closing process. The closing speed is set such that a speed that is just sufficient leads to reliable closing. The closing speed is set in that the door movement is correspondingly damped.

In preferred refinements, the damping action is preferably increased when the door approaches a maximum open position.

In all embodiments, the damping action is preferably increased only if the rotational speed exceeds a predefined rotational speed. In this way, it is for example possible to prevent the damping action being increased during the closing process despite the user guiding the door by hand.

In all embodiments, it is possible for at least one sensor to be assigned which identifies when the user touches the door.

The increase of the damping action is preferably performed only if the movement speed or rotational speed exceeds a predefined movement speed or rotational speed. In this way, it is also possible for unnecessary actions to be avoided, for example in the event of measurement errors, noise or at extremely low speeds, such as are caused for example as a result of oscillations of the door. For example, at a speed of 0.01 degrees/s or a speed of 0.1 cm/s at the door handle, there is generally no need for braking of the door to take place, even if the door is presently (for a very short instant of, for example, 0.001 ms) being intensely accelerated or in particular intensely decelerated. In the case of such short time intervals the (digital) noise predominates. Filtering and/or smoothing of the measurement values are therefore possible and preferred in order to obtain reliable values.

In all embodiments, the damping action is preferably increased if an obstruction is identified in the movement path of the door and a collision of the door with the obstruction is in particular immediately impending. Corresponding smooth braking until the obstruction is reached is preferable. For the automatic identification of obstructions, use is preferably made of known sensors. In particular, ultrasound-based sensors, radar-based sensors and/or optical or acoustic sensors are used.

The damper device is advantageously controlled such that the movement speed or rotational speed profile of the door is such that quiet closing of the door is achieved and/or that a certain opening angle is reached without abrupt changes in speed. The control is performed in particular such that the desired functions (desired opening angle, stoppage before an obstruction, standstill at an end stop) are realized as desired. In combination with the fast switching of magnetorheological damping valves, it can thus be achieved that the speed of the door for example during the closing process is as low as possible already shortly before the closing. The damper device thus requires less residual energy.

In further preferred embodiments, the door component comprises at least one sensor device, or is assigned at least one sensor device, for detecting a measure for a position or angular position of the movable door device or the pivotable door. The control device is configured and designed to determine a characteristic value for a rate of change of the movement speed or rotational speed of the door using sensor data of the sensor device, and to switch the damper device from a relatively low damping action to a relatively high damping action in the event of a rate of change beyond a prior threshold value.

In this embodiment, and also in all other embodiments, the damper device may also be referred to as a brake device or as an immobilizing device.

The damper device is preferably designed as a magnetorheological damper device, and the damping action can in particular be set by means of a variable magnetic field. A magnetorheological damper device has considerable advantages, because it permits extremely fast switching of the damping action from low to intense values and vice versa. The time duration for switching from the relatively low damping action to the relatively high damping action is preferably less than 50 ms. In particular, a switch from a minimum damping action to a maximum damping action and vice versa can be achieved in less than 20 ms and preferably in less than 10 ms and particularly preferably in less than 5 ms. By means of such an extremely rapid system, it is possible to react to all demands flexibly and in real time.

The damping is particularly preferably set to a substantially maximum value if the rate of change exceeds the predetermined threshold value.

The damping can be deactivated or set to a low value if the rotational speed has been reduced to 0. Here, a speed of 0 is also to be understood to mean an extremely low residual speed which arises for example as a result of oscillations, such that minimal speeds in one and the other direction of rotation arise constantly and in alternation.

The damper device preferably comprises at least one controllable flow channel which is filled with a magnetorheological liquid, wherein the flow channel can be subjected to a variable magnetic field, such that the flow resistance of the flow channel and thus a damping action of the damper device can be set to a more intense value by means of a relatively intense magnetic field in the flow channel and to a relatively weak value by means of a relatively weak magnetic field.

The door device comprises at least one controllable damper device and has two connector units which are movable relative to one another, wherein one of the two connector units is connectable to a supporting structure and the other of the two connector units is connectable to a movable door device, in particular of a (motor) vehicle, in order to dampen, in controlled fashion by means of a control device, a movement or pivoting movement of the door device at least partially between a closed position and an open position. Here, in particular, a relative movement of the connector units that are movable relative to one another can be damped in controlled fashion. The damper device comprises in particular a magnetorheological fluid as working fluid. The damper device preferably comprises at least one electrically adjustable magnetorheological damping valve. The magnetorheological damping valve maintains its set state preferably even in an electrically deenergized state, such that a damping characteristic of the damper device can be permanently set as required through electrical setting of the damping valve.

A considerable advantage consists in that a state of the magnetorheological damping valve and thus also a state of the damper device are electrically settable. A particular advantage consists in that the damping valve maintains its set state even when it is switched into an electrically deenergized state. In the context of the present invention, the expression "electrically deenergized" is to be understood to mean a state in which the damping valve and possibly also the damper device is largely or substantially or entirely electrically deenergized. A—very low—current demand may however continue to exist for the purposes of maintaining the control function and possibly for the recording of sensor data. Therefore, in the context of the present invention, "electrically deenergized" means that only an extremely small fraction of the normal current demand of the damping valve is required. Consequently, an electrically deenergized state is to be understood to mean a state of the damping valve in which the damping valve itself requires less than one percent and in particular less than one tenth of a percent or less than 0.1 tenths of a percent of the current demand when it is electrically adjusted. The damping valve particularly preferably maintains its set state when fully electrically deenergized.

In all embodiments, the door component may serve for damping a (linear) movement or a pivoting movement of the movable door device, and in particular door, between the closed position and an arbitrary open position. For example, the door component with the damper device may dampen the movable door device in a controlled manner over the entire possible range of motion and in particular pivoting range. It is however also possible for damping of a pivoting movement to be realized only in certain movement sections or angular ranges or at certain points or angular points.

It is particularly preferable for the door device to be designed as a door and to be pivotably accommodated on the supporting structure. In such embodiments, the door device can be referred to as a door. It is for example also possible, on a vehicle, for a rear hatch, a rear lid or for example an engine hood as a door device to be damped in targeted fashion during the opening and/or closing movement. Although the expression "door" will generally be used below, the expression may also be replaced throughout by the expression "door device" or by "hatch" or "lid".

It is also possible to use a sliding door as a movable door device. It is then possible for targeted damping of the movement to be performed over a part of the opening or closing travel or over the entire sliding travel or at defined points.

Here, the expression "damping" is to be understood to mean damping of a movement, which may also be referred to as braking. This means that the damper device may also be referred to as a brake device. The damping of the movement may lead to fixing of the connector units that are movable relative to one another, and thus of the pivotable door, such that the door device is fixed in a particular angular position and can be moved from there only by means of a particularly high force, which exceeds the maximum force of the damper device.

It is preferably possible for the movement of the connector units relative to one another to be blocked in controlled fashion by means of the damper device.

The fact that the damper device comprises at least one magnetorheological damping valve yields considerable advantages, because the magnetorheological damping valve can change its state in an extremely short period of time. Furthermore, it is possible in contactless fashion, and without a mechanical drive, for a magnetic field to be generated which influences the magnetorheological damping valve and thus adjusts the damper characteristic of the damper device.

In all embodiments, the door component may for example be designed as, or comprise, a driver's door or front passenger door or other vehicle door. In the context of the present invention, a door device or door of a door component is however also to be understood to mean a pivotable hatch or hood such as a front or rear lid of the vehicle such as a rear hatch or an engine hood.

The damping valve preferably comprises a flow channel (or multiple flow channels) through which a magnetorheological liquid can flow, wherein the flow channel can be subjected to a variable magnetic field. In this way, the flow resistance of the flow channel and thus a damping action of the damper device can be influenced by means of the magnetic field in the flow channel. A more intense damping action is obtained in the presence of an intense magnetic field than in the presence of a weak magnetic field.

In preferred refinements, the magnetic field is permanently generated, or can be generated, by means of a magnet device composed at least partially of magnetically hard material.

The magnet device preferably acts (without external control influences) as a permanent magnet which permanently maintains its magnetic characteristics. The magnetization of the magnet device can be permanently changed by means of at least one magnetic pulse of at least one electrical coil. In this way, the magnetically hard material (in the context of its material characteristics) can be arbitrarily and in particular permanently magnetized. A magnetic pulse of an electrical coil of very short duration is sufficient for the magnetization. Here, the magnetic pulse is preferably shorter than 1 second and in particular shorter than 50 ms and shorter than 10 ms, and may even be considerably shorter. The magnetically hard material of the magnet device reacts practically immediately to a concentrated magnetic pulse, and changes its magnetization in particular permanently in a manner dependent on the magnitude and the duration of the pulse. In any case, the magnet device maintains the magnetic characteristics set by means of the pulse for a time period which is longer than the time duration of the pulse. In particular, the magnet device maintains the magnetic characteristics set by means of the pulse for a time period which is several times longer than the pulse. The ratio is preferably greater the 2, greater than 10 and in particular greater than 1000. If it is sought to reverse the magnetization of the magnet device, this may be realized by means of a magnetic alternating field with decreasing amplitude generated by means of the electrical coil, or by means of a targeted counter-pulse. In this way, the magnetically hard material can be demagnetized again, and can subsequently be arbitrarily magnetized again by means of a targeted magnetic pulse.

Through the use of a magnet device which is composed at least partially of a magnetically hard material, it is thus possible for a particular magnetic field, which provides the desired damping action of the damper device, to be permanently maintained even without a supply of electrical current. In particular, it is also possible for the magnetic field of the magnet device to be changed intensely in an extremely short time, such that the damper device or the damping valve can be switched from low damping (minimum damping or maximum or substantially undisrupted throughflow) to a maximum damping action (maximum magnetic field with maximum damping action) in one or a few milliseconds. The magnetic field and thus the set damping action are subsequently maintained, even in an electrically deenergized state.

However, this also means for example that, during a stoppage in a parking space and in the case of a door device or door being open for a relatively long period of time, a corresponding magnetic pulse can be generated. The desired damping is subsequently provided permanently without a further supply of electrical current. The door device (door) may even be fixed in the present angular position. After the transfer into the closed position, the magnetization can be "deleted" by means of a corresponding magnetic alternating field, such that no or only a very slight magnetic field acts on the damping valve of the damper device. The magnetization of the magnet device after a closing process has taken place is preferably always set to a minimum or very low value. This has the considerable advantage that, in the event of an accident, the (vehicle) door continues to exhibit free movement, and can be easily opened even by children or elderly persons.

In all embodiments, it is preferable for at least one sensor device to be assigned for detecting a measure for an (angular) position of the movable or pivotable door. In this way, position-dependent and in particular angle-dependent or angle-optimized control is possible. It is preferable for the sensor device to comprise at least one wheel or in particular friction wheel, by means of which a measure for a relative movement of the two connector units with respect to one another can be detected. Here, it is in particular the case that the (friction) wheel lies on the piston rod and is set in rotation as a result of the longitudinal movement of the piston rod during the relative movement of the two connector units with respect to one another. The wheel or friction wheel is preferably connected to a rotary encoder. An advantage here is that a rotational travel measurement is less expensive than a linear travel measurement. The same sensor/magnet ring/encoder can be utilized over several rotations.

Assuming a relatively high resolution, a linear travel measurement can be implemented less expensively. Other linear measurement systems or sensor devices, which are for example not based on magnetic encoders, are also conceivable. An absolute travel measurement system may also offer advantages. An absolute travel measurement system is rotationally relatively difficult to construct, because it requires a large wheel diameter, because in general only one rotation is admissible. It is also conceivable for two wheels (of different size) to be used. The absolute position can be determined from the two individual positions.

An expedient embodiment and reliable implementation are made possible by an incremental travel measurement system, which is in particular supplemented with additional position information. Index pulses at particular positions may for example be advantageous. This may be a single index for example shortly before the end of the stroke, or else even a sensor provided in the door device or door (for example door closed). An advantage here is that "miscounting" by the sensor device is no longer critical; the sensor device finds its place again at defined positions. Miscounting would be possible for example in the event of slippage, or if for example the supply fails when the door device or door is open (battery change).

In preferred refinements, the control device is configured and designed to set the damping valve to a low (or relatively low) damping action, which acts in an electrically deenergized state, in the closed position of the door. The control device is preferably configured and designed to set the damping valve to an intense (or relatively intense) damping action, which acts in an electrically deenergized state, after a predefined time period has elapsed. The relatively low damping action, which acts in an electrically deenergized state, in the closed position offers considerable safety advantages. The intense damping action, which acts in an electrically deenergized state, in an open position is advantageous if the user holds the door open for a long period of time. Then, in the case of an active system, energy is continuously required in order to maintain the damping action. With the present invention, only a one-off magnetic pulse is required, which subsequently ensures damping or fixing of the door for an arbitrarily long period.

This preferably means that the control device is configured and designed to set the damper device to a low (relatively low) actuation force, which acts in an electrically deenergized state, when the door is in the closed state, that is to say in the closed position. In particular, the control device is configured and designed to set the damper device to a high (relatively high) actuation force, which acts in an electrically deenergized state, when the door is open and after a predefined time period has elapsed. In particular, when the door is closed, the damper device or the damping valve is electrically deenergized and set to a low damping action. During a movement of the door, a low damping action is generally set in order to allow the user to freely open the door. When the open door remains in a particular state, a relatively high damping action is set by means of a magnetic pulse and the remanence of the magnet device.

The control device is preferably configured and designed to set the damping valve to a low damping action, which acts in an electrically deenergized state, during the movement of the door.

In all embodiments, it is preferable that the magnetic field acting in the flow channel can be modulated by means of an electrical coil. This means that, for example in the case of a door open for a relatively long period of time, a permanently acting magnetic field can be set by means of a magnetic pulse. If the door is then for example moved slowly into the closed position by the user, an oppositely acting magnetic field is generated by means of an electrical coil, such that the actually acting magnetic field in the damping channel of the damping valve is reduced, and thus the door can be pivoted freely.

Here, it is possible for the electrical coil for modulating the magnetic field to also be used for generating the magnetic pulse. It is however also possible for at least two electrical coils to be used, of which one is used for example for generating a magnetic pulse for the permanent magnetization. The other electrical coil may then be used for example for modulating the permanent magnet.

It is possible and preferable that the door component comprises 2 connector units which are movable relative to one another, and at least one controllable damper device which comprises a magnetorheological fluid as working fluid. Here, one of the two connector units is connectable to a supporting structure, and the other of the two connector units is connectable to a pivotable door, in particular of a vehicle. A relative movement of the two connector units with respect to one another can be damped by means of the damper device in order to dampen, in controlled fashion, a pivoting movement of the door device at least partially between a closed position and a normally fully open position by means of a control device. The (magnetorheological) damper device comprises a piston unit and a cylinder unit surrounding the piston unit. The piston unit divides a cylinder volume of the cylinder unit into two chambers. Here, the piston unit is equipped with a first one-way valve. The two chambers are connected to one another, by means of an external return channel which is equipped with at least one controllable magnetorheological damping valve, so as to form a one-way circuit such that the magnetorheological fluid flows in the same flow direction (through the piston unit) during the retraction and deployment of the piston unit. This means that the same flow direction exists through the first throttle valve and damping valve.

Such a door component has numerous advantages. Said construction permits an embodiment in which only low forces preload the door in one or the other direction. At the same time, by means of a fast adjustment of the magnetic field, a maximum damping force can be set, if required, in order to prevent or reduce damage to trapped body parts.

A compensation volume is preferably provided on a low-pressure side of the damping valve. The compensation volume of said type serves in particular for compensating the volume of a retracting piston rod. It is however also possible for the piston unit to have one continuous piston rod or two piston rods, which at both ends are led out of the cylinder unit to the outside. If, for example, a continuous piston rod is used, the volume does not change as a result of the relative movement of the two connection units with respect to one another, and there is therefore no need for a compensation device or a compensation volume to be provided for the volume of the piston rod. In such cases, too, however, at least a compensation volume may be advantageous in order, for example, to provide compensation in the presence of fluctuating temperatures (temperature compensation). Such a compensation volume may be referred to as temperature compensation volume.

By contrast, if use is not made of a continuous piston rod, then as the piston rod plunges into the cylinder unit, the available volume is decreased in size, such that the damping fluid that was previously present there is displaced. If the compensation volume is arranged on the low-pressure side of the damping valve, then a considerably lower restoring force is generated by the preloaded compensation volume. In this way, a movement in both pivoting directions is easier than if the compensation volume were arranged on the high-pressure side of the damping valve.

It is preferably also the case in this embodiment that the damping valve has at least one flow channel through which a magnetorheological liquid can flow, wherein the flow channel can be subjected to a variable magnetic field, such that the flow resistance of the flow channel and thus a damping action of the damper device can be influenced by means of the magnetic field in the flow channel.

It is preferable for a first chamber of the two chambers to be connected to the damping valve and for the damping valve to be connected in terms of flow to the second chamber by means of a second one-way valve. Here, the connection in terms of flow may be realized in each case indirectly or directly. The second one-way valve preferably permits only a flow into the second chamber. The first one-way valve permits only a flow from the second chamber through the piston into the first chamber.

It is preferable for a compensation chamber with a preloaded compensation volume to be provided, wherein the compensation volume is connected to the damping valve and to the second chamber. The compensation chamber may also be arranged in the flow path between the damping valve and the second chamber.

In a further embodiment, the door component has at least one controllable damper device, which contains a magnetorheological fluid as working fluid, and comprises two connector units which are movable relative to one another, wherein one of the two connector units is connectable to a supporting structure and the other of the two connector units is connectable to a movable or pivotable door, in particular of a vehicle, in order to dampen, in controlled fashion by means of a control device, a movement or pivoting movement of the door at least partially between a closed position and also a maximum open position, for example. Here, the magnetorheological damper device comprises a piston unit and a cylinder unit that surrounds the piston unit. The piston unit divides a cylinder volume into two chambers. Here, the piston unit has a first piston rod, which extends through the first chamber, and a second piston rod, which extends through the second chamber.

Said door component can also be controlled according to the invention. Here, the door of the door component can—without a corresponding magnetic field—be moved practically without pressure in both directions. A virtually immediate stoppage can be achieved with a corresponding magnetic field.

It is preferable for both piston rods to be led in each case from the cylinder volume and/or the cylinder unit to the outside. It is however also possible for one of the piston rods to be of telescopic form, and to be fastened at one side to the piston and fixedly connected at the other side to the cylinder unit. The telescopic parts of the telescopic piston rod are in particular sealed off with respect to one another. In such an embodiment, there is likewise no need for volume compensation for the plunging of the piston rod. Temperature compensation is preferably provided.

In all embodiments, it is preferable for the first and the second piston rod to each have the same diameter. It is however also possible for the two piston rods to have a different diameter. For example, by means of a corresponding diameter ratio, a corresponding preload force can be set for the retraction or deployment.

The damper device is preferably equipped with a controllable damping valve with a flow channel through which a magnetorheological liquid can flow. The flow channel can be subjected to a variable magnetic field, such that the flow resistance of the flow channel and thus a damping action of the damper device can be influenced by means of the magnetic field in the flow channel.

It is preferable for the damper device to comprise at least one compensation device with a compensation volume, in particular for example for compensating temperature fluctuations.

The compensation device preferably comprises a compressible compensation volume. A compensation volume of said type may be formed by a sponge-like structure, a rubber bladder or a closed-off and flexible air vessel.

It is preferable for at least one of the two piston rods to serve as an electrical connector unit. It is then possible for at least one connector cable to be guided on the piston rod. It is also possible for connector cables to be guided on or in both piston rods. The connector cables or the connector cable may be guided in or on the piston rod. It is possible for the required electrical current to be supplied via a cable, and for signals to be transmitted in a manner modulated thereon.

It is preferable for at least one of the two piston rods to be received, outside the cylinder unit, in displaceable fashion in a tube equipped with at least one slot. It is then preferable for the connector cable to be guided out in the slot. The tube part is preferably a constituent part of, or fixedly connected to, one of the connector units.

In all embodiments, it is preferable for the damper device to comprise at least one measuring device, wherein in particular, a part of the measuring device is fastened to the piston rod. In the case of such a measuring device, a measure for a pivoting movement of the door is detected by means of a linear movement of the damper device. Since there is a unique assignment between angle and linear position, it is possible for the pivoting position of the door to be inferred from the absolute position of the piston rod relative to the cylinder unit. Correspondingly, a rotational speed of the door can be inferred from the signals of the measuring device. Also, a slowing of the acceleration of the door pivoting can be inferred from the signals of the measuring device. As a sensor, use may be made in particular of a wheel or friction wheel which bears for example against the piston rod and which detects a relative movement of the piston rod.

In all of the above-described embodiments, it is preferable for the door component to comprise the door. It is also possible for the door component to comprise the supporting structure.

The sensor device preferably detects a measure for a pivot angle or a position of the door and/or a measure for the relative position of the connector units with respect to one another.

In all embodiments, it is preferable for at least one position sensor to be assigned which detects a measure for a horizontal orientation or a measure for a deviation from the horizontal orientation of the vehicle. Then, the control device can control the damping action of the damper device in a manner dependent on the deviation from the horizontal orientation. It is for example expedient for an open door to be damped differently if the vehicle is standing on a steep slope and there is the risk of the door falling closed or, in the case of a different orientation of the vehicle, falling open.

In all embodiments, it is also preferable for at least one load sensor to be assigned for detecting a load applied to the door. With a load sensor of said type, it is for example possible to detect a bending moment applied to the door.

It is furthermore preferable for at least one near-field sensor to be assigned, or for the signals of a near-field sensor to be used, for identifying obstructions in the surroundings.

In all embodiments, it is possible for a virtual raster to be generated by means of the control device such that, during the opening or closing of the door, the user senses raster points at particular angular steps of for example 5° or 10°, or other distance steps, as the user is opening or closing the door.

In all embodiments and refinements, it is preferable for an electrical coil to be arranged within the cylinder unit. In particular, the electrical coil is arranged in the piston of the piston unit, and is arranged there as a so-called lying electrical coil. This means that the coil axis is oriented transversely with respect to the longitudinal extent of the cylinder unit or transversely with respect to a relative movement of the piston. The coil axis is in particular also oriented transversely with respect to the flow direction of the magnetorheological damping medium. In this way, a particularly effective working action is realized. An electrical coil in the piston unit is preferably used in the case of damper devices which have one piston rod or two piston rods or one continuous piston rod. In the case of a damper device with a one-way circuit, it is by contrast the case that the damping valve is preferably arranged outside the piston and outside the damper chambers.

In one embodiment, an MRF damper device comprises a separating piston which is acted on by air/gas, and thus a preloaded piston rod compensation volume. This gives rise to a very simple and inexpensive construction. As a result of the preload, the piston rod is automatically deployed with a force. Depending on the preload pressure (air pressure in the piston rod compensation volume) and the door kinematics, the door thus opens automatically. Whereas it is the case during the opening of the door that the damping force can be adapted by means of the preset electrical current, it is possible only for a limited (reduced) damping force to be generated—in a manner dependent on the preload pressure in the piston rod compensation volume—during the closing of the door. In the case of such a system, too, it can be sought to set as high a damping action as possible in hazardous situations in order to prevent damage and injuries.

The system or the position of the separating piston may also be "reversed", that is to say the piston rod then automatically retracts. Depending on the preload pressure in the piston rod compensation volume, a limited (reduced) damping force can be generated during the opening process.

In one variant, an MRF damper device is used in which the piston rod compensation volume and thus the preload volume are situated on the low-pressure side both during the opening process and during the closing process (virtually free from forces in both directions). Thus, the preload force (a few Newtons) or the automatic movement is minimal, and the generation of the full damping force is possible in both movement directions (pulling and pushing side, or opening and closing).

The door component also offers considerable advantages, for example in the case of an electrical failure (for example following an accident). An important point is also that the failsafe characteristics can be configured such that the door can be opened easily and with little force in the event of an accident. Here, for opening, only the basic damping should be overcome.

In the case of conventional systems, this is a problem. If a low basic force is generated in an electrically deenergized state, then a large amount of electrical current is required for the high holding force (damping force). In the event of an accident, the door can thus be easily opened. However, if the vehicle is stationary with a door open for a relatively long period of time, for example on a gradient, then a large amount of current is required for holding the door. If the vehicle stands overnight in this state, then the battery is empty in the morning. A continuous consumer, of which there are in some cases even 4 (four doors), is not practicable. Many vehicles already now switch off the engine and the consumers after a few minutes.

By contrast, if the high basic force is generated in an electrically deenergized state (for example by means of a permanent magnet), then the door can no longer be opened in the event of an accident. In particular if children are seated on the rear seats or if persons are injured, the doors must be able to be opened with minimal force.

One solution would be to use a permanent magnet to generate not the full damping force, which in turn may be critical in the case of children in the event of an accident (movement still too difficult) or in the case of an inclined parking position (holding force is not sufficient).

A further solution would be an electrical current store which reduces the high holding force after the accident. A disadvantage is the high cost. A further disadvantage is that, even with this, it cannot be ensured that this will still function correctly after an accident or can provide the required current for long enough (it must also still detect the opening).

The invention offers an optimum solution here and contributes toward preventing injuries.

A further advantage is that the door can be moved by the user into any desired position with regard to the opening angle. This may be realized by the user guiding the door in continuous fashion until the desired final angle is reached or by way of a striking action by the user.

The detent function of the system then holds the door at the corresponding opening angle. Here, it is of no importance whether the vehicle as a whole is standing on a horizontal or inclined plane. The user however has the possibility of subsequently opening or closing the door further proceeding from said detent function. One conceivable enhancement of the detent function comprises that the door can be moved away from the rest position of the detent function more easily in an opening direction than in a closing direction (unilaterally acting actuator). This is the case both on a horizontal and on an inclined plane. In general, for this purpose, it is necessary to identify the "demand" for an opening or closing process by the user.

It is possible:

If the door is pushed against, there is a resulting specific load moment. Depending on magnitude, this causes a movement of the door. This may be identified/measured by means of suitable sensors (for example travel, speed, acceleration) at suitable locations (at the actuator, at the center of rotation of the door, at the door handle etc.). Here, if a particular threshold value is exceeded, the opening or closing process is/may be initiated.

If the vehicle is situated on an inclined plane, then increased load moments/basic moments arise in the detent position owing to the masses acting on the damping system. This is preferably correspondingly taken into consideration, for example by means of an increase of the threshold values for the triggering of an opening or closing process. The adaptive adaptation of the threshold values may be realized using the information regarding the vehicle inclination, which can be easily detected by sensor means.

A further possibility for identifying an opening or closing process is the use of contact or distance sensors of any type on the outer and inner shells of the door (capacitive, inductive, optical sensors; seat detection sensor (is the user situated on the seat or not)). It is thus possible, if a hand or an object is approaching or in the event of contact with the hand or other objects, to identify whether an opening or closing process should be permitted.

Furthermore, the processing of the information may be performed in near-field detection systems.

All of the abovementioned items of information may also be used to identify whether the user wishes to use the door as a disembarking aid. In this case, too, it is of crucial importance whether the vehicle is situated on a horizontal or inclined plane. This can be taken into consideration correspondingly to the abovementioned methods.

Smooth opening and closing of the door is preferably made possible.

The detent function can be utilized such that, if the door is pushed open or pushed closed or guided in one of the two directions by the user, a smooth movement to the desired door angle always occurs. During the closing of the door, for example, the door would always come smoothly to a standstill at a defined opening angle. During the closing, mechanical or electromechanical components then later perform the final closing and fixing of the door. This is likewise the case during the opening of the door; regardless of the momentum/the impulse/the initial speed/the guiding force to which the door is subjected, smooth opening to the desired opening angle always occurs.

The desired opening angle may in this case be:

the maximum opening angle. Here, owing to the smooth opening process that is ensured permanently under all circumstances, aside from the comfort, it is also ensured that the maximum torque acting at the maximum opening angle is limited such that a plastic deformation or fundamental overloading of the AB pillar can be avoided. This is the case both for load situations in which the vehicle is situated on a horizontal plane and those in which it is situated on an inclined plane.

any angle within the working range.

Said desired opening angle may vary on the basis of:

manual user definitions or automated functional enhancements, as described for example in the next bullet point.

Furthermore, wear can be minimized as a result of a smooth opening or closing of the door, by minimization of load peaks or through avoidance of wear-increasing working ranges.

It is possible to provide a virtual stop on the basis of obstructions in the working range (possible maximum opening angle of the door):

By means of suitable sensor equipment or from information from the near-field detection, it can be identified whether an obstruction is situated in the working range of the door. For the near-field detection, it is possible here to use for example camera systems (under the door sill or top view) or similar systems; furthermore, it is for example possible to use distance sensors etc. A virtual stop can be implemented on the basis of said information. Here, the maximum permitted opening angle is calculated/defined on the basis of the abovementioned information from the location of the obstructing object. On the basis of the new maximum possible opening angle, the functions described above (in all preceding points) are implemented with a reduced opening angle. It is also conceivable here for a safety distance to be taken into consideration in addition to the maximum possible opening angle. It is furthermore possible (but not imperative) that, after the safety distance to the obstructive object is reached, a raster function with any characteristic/granularity may be stored, with which a finely incremented approach into the immediate vicinity of the obstructive object is made possible.

It is also possible for a blocking function to be implemented which intervenes if objects of any type approach the working range of the door (for example approaching cyclists) before said door is opened/intended to be opened. The information may be generated on the basis of suitable sensor equipment or on the basis of information from the near-field detection. The system processes said information such that an opening of the door is prevented on the basis of the adaptive damping.

A further advantage of the implementation with MRF actuators is that on the basis of the adaptivity, environmental influences of all types can be reacted to:

Wear phenomena in the system (for example increased door friction with increasing age, etc.).

The temperature dependency of the door friction can also be compensated. It is thus possible for the temperature at the door mounting points to be taken into consideration.

External influences can be compensated. The action of wind can thus be compensated. It is for example also possible for a snow load on the rear hatch to be compensated.

Loading (if multiple persons are seated in the vehicle, the ventilation of air from the interior space no longer functions as effectively).

Windows open or closed: in the case of open windows, the doors can be closed more easily.

Vehicle ventilation system: owing to aging, this can become blocked, whereby the closing of the doors becomes more difficult.

Vehicle is situated on an inclined plane (increased forces owing to the masses involved).

Wind

Disturbance variables in general, regardless of their nature.

On the basis of all of the influences mentioned above, the behavior of the system changes in relation to the basic state/with aging/with time/on the basis of temporary circumstances (for example inclined plane). Said influences can however at best be detected and taken into consideration.

The detection is performed by means of (intelligent) algorithms which observe the system behavior, in conjunction with suitable sensor equipment. The control strategies—also described in all points above—may be adapted such that the system behavior as a whole always remains constant, or is always perceived as constant by the user.

The door ideally always closes smoothly and with a full sound. For this purpose, the movement speed is correspondingly controlled. If for example the door seals change (swell up . . . ), the automobile is distorted (after an accident, or one wheel is standing on the sidewalk), or the hinge has increased friction shortly before the closed position, the required closing force changes (it becomes greater).

The possibility of the adaptive adaptation of the damping yields several possibilities for increasing the comfort or increasing the performance, etc.:

By means of suitable sensor equipment or on the basis of the information from the near-field detection, or for example by means of a sensor in the key with personal information or by means of cameras situated in the vehicle, it is for example possible to identify which driver is situated as the user at the system. In this way, the characteristics of all of the above-described functionalities can be adapted to the present user (for example adaptive damping of the moment for identifying the "demand" for an opening or closing process; for example male/female distinction).

It is furthermore possible, on the basis of the adaptation of system parameters of the control, to react adaptively to all circumstances without the need to perform any mechanical adaptations during operation or during manufacture front doors/rear doors different vehicle model With a simple configuration of the system, it can be achieved that, for example, both rear doors cannot be opened during travel, or else in a standstill state. This may also be performed dynamically in a manner dependent on the users situated on the rear seat bench. This may be identified by means of suitable sensor equipment or on the basis of the information from the near-field detection or for example by means of a sensor in the key with personal information or by means of cameras situated in the vehicle.

In general, the opening of the doors can be prevented during travel, or permitted only below certain vehicle speeds, or permitted only with increased difficulty.

Alternatively, if the door is opened during travel, a suitable damping measure can be initiated (for example blocking of the door against swinging back after the braking process).

Antitheft protection: The above functions may also be used for antitheft protection (undesired embarking and disembarking is no longer possible). A further advantage here: it is thus also not possible for any articles to be stolen from the vehicle (only by breaking the windows).

In the event of unspecifiable obstructions being detected in the working range (for example light snow) from the general sensor equipment or from information from the near-field detection, the system should for example provide an adapted opening of the door. In the case of such uncertainties, it would for example be possible for the system to provide a finely graduated raster function from the start of the opening process. Thus, by means of the automatically generated haptic feedback, the user is provided with the feedback that unassignable obstructions (which have only a limited damaging effect) are situated in the working range.

Furthermore, aside from a maximum opening angle based on obstructions in the working range for the opening process of the door, it is likewise possible for a maximum closing angle based on obstructions in the working range for the closing process to be taken into consideration (virtual end stop during the closing movement). It is thus possible for not only damage to articles on the vehicle (owing to obstructions such as for example beverage crates) during the closing process but also injuries to persons, for example trapping of fingers or hands, to be prevented. In general, however, painful/injurious trapping of for example fingers/hands is assisted already by the comfort function of the smooth closing. This is because said function already brings the door to a standstill in all situations with little residual energy (residual speed) before the detent function.

Anti-trapping protection: Here, an algorithm or a control regime can abruptly apply a high electrical current to the actuator in the event of an unusual speed reduction shortly before the closed door position, such that said door is in particular braked as quickly/intensely as possible. The fast reaction time of the actuator is highly expedient here. A movement speed of 0.5 m/sec equates to 0.5 mm/ms, and thus, in the case of a reaction time of 6 ms, the door component comes to a standstill within 3 mm.

Damage minimization: the sensor equipment identifies no obstruction, and it is intended to open the door in unhindered fashion. The travel sensor monitors the opening and identifies an atypical movement (for example intense braking owing to an undetected obstruction such as a low post in the center of the door). The "MRF emergency stop" imparts a full braking action (as described above with reference to "anti-trapping protection"; a movement speed of 0.1 m/sec=0.1 mm/ms; in the case of 6 ms, it takes 0.6 mm to come to a standstill) and, owing to the very fast reaction time, thus reduces the damage (the body panel is possibly only elastically deformed as a result . . . ).

This is also important in the case of snow, bushes, branches, etc., that is to say obstructions that are difficult to detect.

Various circumstances of environmental influences can be taken into consideration. For example, a situation may arise in which, when the user is absent from the vehicle, a further vehicle parks adjacent to the user's vehicle, which vehicle was not present when the user departed. In this case, it should be ensured that the general sensor equipment, or the information from the near-field detection before the opening of the door, transmits the maximum opening angle to the SDS system in good time. If said value before the opening of the door is not adapted (for example if the final value before the user departed the vehicle is used), then damage may occur in some form. For example, it will become necessary to find concepts which continuously update such information (even during "non-operation" of the vehicle). This may be realized for example by means of reduced processing (for reduction of the energy requirement) of the corresponding sensor equipment and/or algorithms and/or near-field detection systems in the form of a stand-by function. It is in any case preferable that this is performed before the initial actuation of the door; the advance time is in this case dependent on the performance of the algorithms/sensor equipment that determine(s)/measure(s) the maximum opening angle. It is preferable for obstructions to be newly detected upon actuation of the door lock.

Sensors may be used inter alia on the exterior mirror, on the door sill, under the body panel, on the inside or on the outside. The sensors may be attached vertically to the window frame.

With the use of remanence, two magnet devices may be used, of which the first magnetic field unit is a magnetic field unit with steel core, coil and flow channel. The second magnetic field unit is a remanence system with remanence material in the core and/or in the rest of the magnetic circuit. If a high damping force is required over a relatively long period of time, the remanence material is magnetized by means of a corresponding electrical current pulse (or electrical current pulse profile). After the renewed application of an electrical current pulse or electrical current pulse profile, the magnetic field is reduced again or eliminated entirely. When the door is closed, no remanence field, therefore easy opening possible in the event of an accident.

In the case of a flow of for example 0 to 3 amperes, the magnetic field can be generated as in a "normal" magnetic field unit. Increasing current=greater magnetic field=greater damping force. All of this continuously variable and very rapid (<10 ms).

Electrical current pulses or electrical current pulse profiles of for example 5 to 6 amperes remagnetize the remanence material, whereby a residual magnetic field remains. In this way, a (high) holding force can be generated without a supply of electrical current.

In all embodiments, it is also possible for an active system to be used.

Here, the following problem arises. The automatic opening and closing of the doors, as is the case nowadays with luggage compartments, will become established. The use of the current luggage compartment closing mechanisms (spindle drives) in the driver's or front passenger's door will not be desired, because these are far too slow (the customer does not wish to wait several seconds before being able to embark) and are very loud. Furthermore, in the event of an accident, the system cannot be opened (very high forces required in the electrically deenergized state). If the spindle drive also then deforms, the door no longer opens at all. Furthermore, the door forces are very high in relation to the luggage compartment cover (100 Nm when the automobile is in an inclined position). In the case of the luggage compartment cover, a gas spring or the gravitational force assists during the closing process.

In all embodiments, it is possible to use nitrogen or argon or large-molecule gases, which are less volatile, as actuator medium or as compressible medium in for example the compensation volume.

Gas dampers from the prior art generally have the problem in vehicles that, owing to the temperatures, the forces change significantly (gas volume; low temperatures—lower pressure; high temperatures—higher pressure). This yields differences in the characteristics. In the case of the invention with a magnetorheological damper device, temperature compensation is preferably performed. In all embodiments, it is therefore preferably possible to compensate an (outside) temperature. For this purpose, it is for example possible for the electrical coil to be additionally electrically energized, and thus for the damper device to be heated. It is however also possible for a separate heating device (only for low temperatures) to be installed, for example a heating wire, a heating sleeve around the damper device etc. The heating device may be activated for example when the user enters the vicinity of the vehicle, that is to say at an early time (Keyless Go . . . ) or uses the door. The heating device may however also be programmed (e.g. mornings . . . ).

Preferably, the door component comprises an electrical lock. A "soft close" facility is possible, wherein the door closes automatically in the final millimeters. This is preferably actuated in the reverse manner, that is to say the door is released (and the lock opened). The door is preferably then automatically opened, for example by virtue of the adaptive damper pushing the door open. The driver can thus open the door, in order to embark, using a smart device (mobile telephone, smart watch . . . ) or a radio key. The driver does not need to touch the door for this purpose, which, aside from the increased comfort, also has the advantage that the driver does not need to make his or her hands dirty, because the user indeed no longer has to touch the door in order to open it. It is also conceivable for the user to open the door by means of gesture control (for example a foot movement at/under the door), which is advantageous if the user has his or her hands full (for example after shopping). Furthermore, the user can embark directly, in particular if he or she approaches the vehicle from behind (the rear).

It is possible for only one door (for example the driver's door or the rear doors) to be equipped with the invention.

In current vehicles from the prior art, the door hinges are in some cases mounted (door kinematics) such that the door moves more easily in one direction than in the other. This can be compensated by means of the door component according to the invention.

It is now possible to use an active system with an MRF pump, in the case of which an MRF valve is used as a pump. The drive motor can be driven in both drive directions. Depending on the direction of rotation of the motor, a cylinder connected thereto is retracted or deployed. To realize control of the cylinder speed, the MRF valve can divert 0% to 100% of the volume flow via a bypass.

In all embodiments, it is possible in the context of the present invention for the relatively broad expression "door device" to be restricted to the more specific expression "door", and for the expressions to be correspondingly interchanged. Furthermore, in all embodiments, it is possible for the invention to be concretized as a pivotable door or pivotable flap or a pivotable lid such as a rear lid. In this context, a movable door device comprises a pivotable door, and may be restricted thereto or concretized as such, such that, throughout the entire description, the expression "movable" may be rendered more precisely as "pivotable". Conversely, the expression "door" may be replaced by "door device", and the expression "pivotable" may be replaced by "movable".

It is also possible for an opening and/or closing movement of a top of a cabriolet to be damped using the invention. In such embodiments, the movable top is to be regarded as a door device, and the entire structure with the supporting structure and the top held thereon is to be regarded as a door component.

The invention is not restricted to use in automobiles, and may also be used in for example trucks/heavy goods vehicles; agricultural vehicles, other (motor) vehicles, autonomous vehicles, taxis, items of furniture, aircraft and military vehicles.

It is also possible for an opening and/or closing movement of a top of a cabriolet, for example, to be damped using the invention. In such embodiments, the movable top is to be regarded as a door device, and the entire structure with the supporting structure and the top held thereon is to be regarded as a door component. The applicant reserves the right to direct a claim to a vehicle apparatus or other apparatus in which a movable device is held on a supporting structure so as to be movable between an open position and a closed position and in the case of which the movement can be damped by means of a magnetorheological damper device and in the case of which the movement speed of the door device is monitored. In particular, the movement speed can be controlled such that the door device comes to a standstill at a settable distance before an obstruction (which is known or detected by means of sensors).

Further advantages and features of the present invention will emerge from the description of the exemplary embodiments, which will be discussed below with reference to the appended figures.

DESCRIPTION OF THE INVENTION

Figure 1:
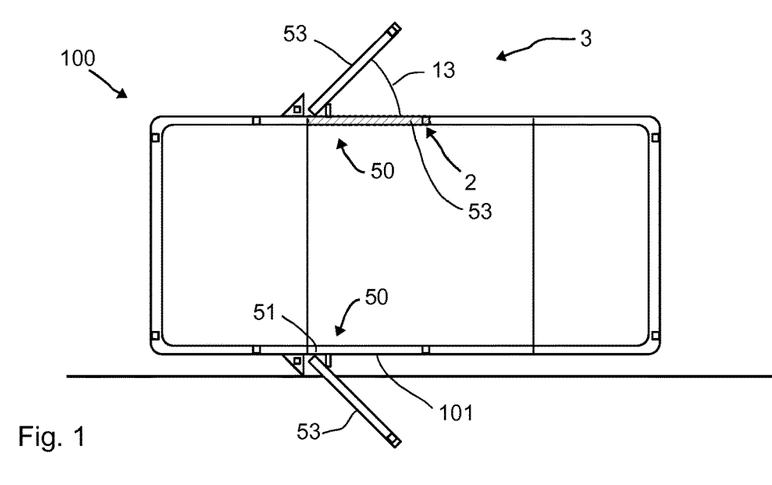
FIG. 1 shows a schematic plan view of a vehicle with a door component according to the invention.

FIG. 1 shows a schematic plan view of a motor vehicle 100 stopped at the edge of a road, in which motor-vehicle there are provided in this case two door devices 53 designed as doors, which are both open. The doors are situated in each case approximately in an angular position 13. The doors are each part of a door component 50, which in this case comprises the doors 53. It is equally possible for a door 53 to be attached to the door component 50. The door component 50 comprises, in any case, connector units 51 and 52 for connection to the supporting structure 101 of the vehicle 100 and to the door 53, for the purposes of holding the door pivotably on the supporting structure 101. Here, the door may be composed of multiple units, which are in each case pivotable and which are articulatedly connected to one another. The door may be held so as to be pivotable about one or two or more pivot axes. Hatching is used to show a door 53 in the closed position 2, in which the door in this case terminates flush with the vehicle.

With the invention, it is possible to achieve that, in the event of an intense deceleration of the door 53, a greater or maximum damping action is set practically immediately in order to as far as possible prevent or at least reduce or minimize damage. If the pivotable door 53 of the motor vehicle 100 is slammed closed and thus moved rapidly in the closing direction, and if for example a leg or a hand or some other object is situated in the path of the closing movement, then—without the use of further sensors—the door 53 firstly strikes the leg or the hand or an object and, in the process, is unexpectedly braked. This means that, for example in the case of a relatively high rotational speed of the door, an unexpected and unexpectedly large change in the rotational speed occurs. Here, this means that the rate of change of the movement speed of the door device, or in this case specifically the rate of change of the rotational speed, exceeds a predetermined threshold value.

With the invention, in the event of such a process being detected, a maximum damping action is immediately set such that damage can be very substantially prevented.

If, during the opening of the door 53, the latter strikes with the outer panel against an obstruction, the rotational speed of the door is immediately considerably reduced. Since the panels can however generally deform in a resiliently elastic manner over a certain range, it is thus often possible for damage to the door 53 to be prevented entirely in the case of an immediate reaction and maximization of the damping action.

The method may also be performed with the door components described below.

Figure 2:
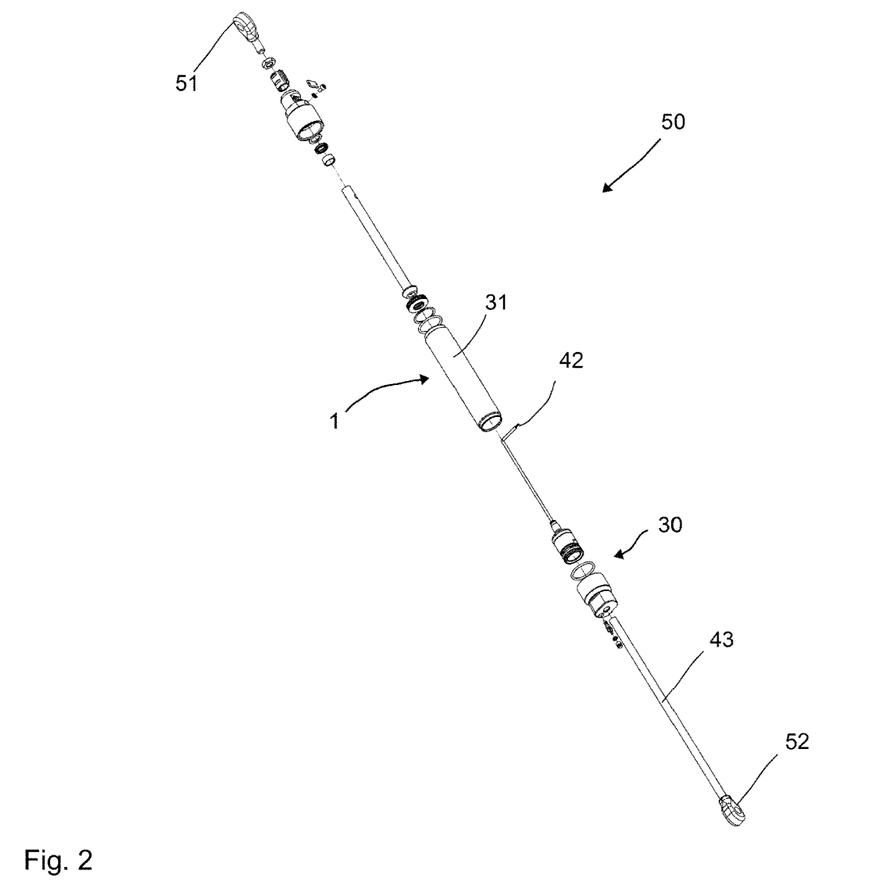
FIG. 2 shows a schematic exploded illustration of the door component as per FIG. 1.

FIG. 2 shows, in an enlarged illustration, an exploded illustration of the door component 50, wherein the door component 50 comprises a damper device 1 which has a damper which operates on a magnetorheological basis.

The door component 50 in FIG. 2 has connector units 51 and 52 for connection to the supporting structure 101 and to the door 53, in order a defined and controlled pivoting of the door during the movement from the open position illustrated in FIG. 1 into the closed position 2 also indicated in FIG. 1.

The damper device 1 comprises a cylinder unit 31, in which the piston 38 of the piston unit 30 divides the cylinder volume 32 into a first chamber 33 and a second chamber 34 in a variable manner.

A compensation volume 36 of a compensation chamber serves for the compensation of the piston rod 43 plunging into the cylinder unit 31.

Figure 3:
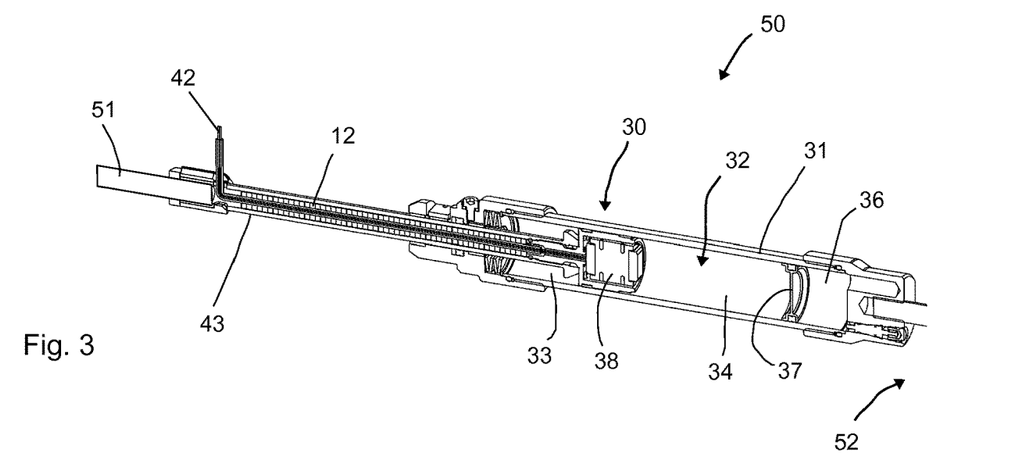
FIG. 3 shows an enlarged cross section of the door component as per FIG. 1.

FIG. 3 shows an enlarged cross-sectional illustration of a part of the door component 50 from FIG. 2.

On the assembled damper device 1 that is illustrated in section here, it is possible to see the piston unit 30 with the piston 38 in which the magnet device 9 with the electrical coil 10 is arranged. The piston 38 divides the cylinder volume 32 of the cylinder unit 31 into a first chamber 33 and a second chamber 34. The damping valve is arranged outside the piston unit 31. The magnet device 9 with the electrical coil 10 is arranged on the damping valve.

Furthermore, in the cylinder unit 31, the compensation device with the compensation chamber 37 and the compensation volume 36 is illustrated. The compensation chamber 37 is separated from the second chamber 34 by a separating piston, which slides in a variable manner within the cylinder unit 31. It is also possible for the compensation chamber to be located on the other side, wherein sealing is then necessary with respect to the piston rod extending through and with respect to the first chamber 33. The compensation chamber 37 is situated on the low-pressure side of the one-way circuit. Valves 47 and 48 for the filling of the first and second chambers 33, 34 and of the compensation chamber 37 are provided. The compensation chamber 37 is filled with a gaseous medium at a low pressure, such that the plunging-in volume of the piston rod 43 can be compensated.

To the piston rod 43 there is attached a sensor device 12, by means of which an absolute position of the damper device 1 can be detected here. By interrogation of the sensor device, the position of the two connector units 51 and 52 with respect to one another can be detected, such that, by means of the sensor device, the angular position of the door 53 is also directly detected.

The connector cables for the electrical coil in the piston 38 and the sensor device 12 are in this case guided through the piston rod 43 to the outside.

Figure 4:
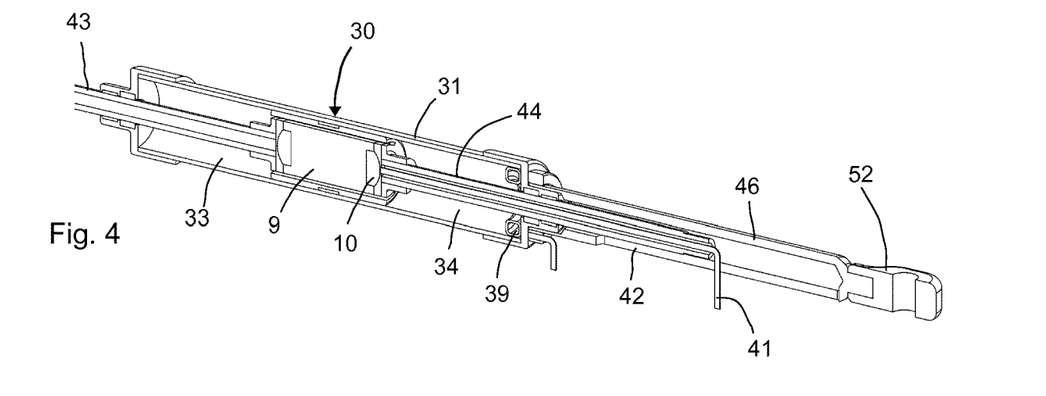
FIG. 4 shows another embodiment of a door component according to the invention.

FIG. 4 shows a variant in which a continuous piston rod or 2 piston rods 43, 44 are provided. The interior of the cylinder unit 31 is divided further by the piston 38 into 2 chambers 33 and 34. Here, the two piston rods 43 and 44 are guided to the outside at the respective ends, such that there is no need for a plunging-in of the volume of a piston rod to be compensated. To be able to compensate a volume expansion as a result of temperature differences, a compensation device 39 is provided here, which is designed for example as a hollow rubber ring or the like, and which thus provides corresponding volume compensation by way of a volume expansion or decrease in volume as a result of temperature differences. Such a compensation device may be arranged in the chamber 33 or in the chamber 34. Compensation devices in both chambers 33 and 34 are possible.

In all embodiments, the piston 38 is also designed as a damping valve 5, and has one or 2 or more flow channels 7 which connect the first chamber 33 to the second chamber 34. The chambers 33 and 34 are filled with a magnetorheological fluid 6. The damping is in this case achieved by virtue of a magnet device 9 or at least one magnet device 9, which comprises magnetically hard material and in this case also an electrical coil, being arranged on the damping valve 5.

By means of a short electrical pulse at the coil 10, a magnetic pulse is triggered, which leads to a permanent magnetization of the magnet device 9, such that, subsequently, the flow resistance through the flow channel 7 increases in a manner corresponding to the intensity of the acting magnetic field 8.

By means of corresponding remagnetization of the magnet devices 9, it is thus possible to set any desired damping of the door movement of the door 53. It is furthermore possible, in addition to a permanently acting magnetic field, to use the coil 10 to dynamically model the magnetic field 8 of the magnet devices 9. By means of a magnetic field oriented in the same direction, the damping can be intensified, and by means of a correspondingly oppositely oriented magnetic field, the damping can be attenuated or even reduced to zero.

In this exemplary embodiment, the connector cable 42 or the connector cables 42 are guided to the outside through the piston rod 44. The piston rod 44 is displaceably received in a tube 46. Here, at the end of the piston rod 44, the connector cable 41 is guided out of the piston rod and is guided to the outside through a slot 42 in the tube 46.

By way of example for all exemplary embodiments, a control device 4, by means of which the damping valve 5, the damper device 1 and/or the door component 50 as a whole can be controlled, is shown in FIG. 4. The control device 4 may also be part of the vehicle 100 or of some other apparatus.

Figure 5:
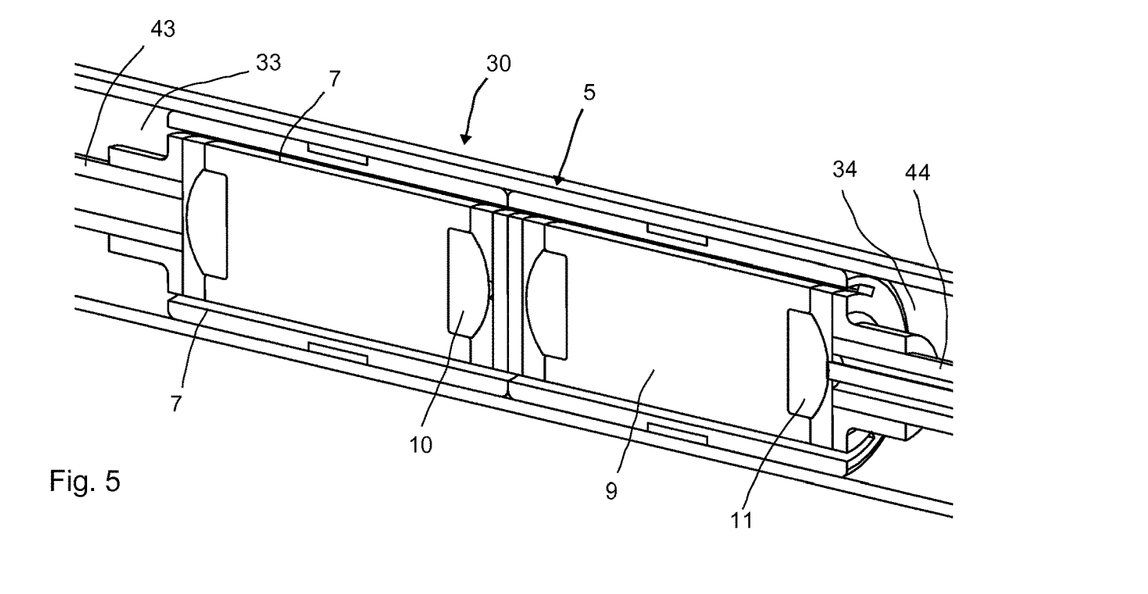
FIG. 5 shows a further embodiment of a door component according to the invention.

FIG. 5 shows another variant in which 2 magnet devices 9 or at least 2 electrical coils 10 and 11 are provided. The magnetic coils 10 and 11 of the magnet devices 9 are in turn arranged in the piston 38 of the piston unit 30 within the cylinder unit 31. In this case, too, the piston separates 2 chambers 33 and 34 of the cylinder volume 32. First and second piston rods 43 and 44 may be provided or only one piston rod is guided out on one side. In such a case, a compensation chamber 37 having a compensation volume 36 is again required.

Here, an electrical coil 10, 11 is used for generating a magnetic pulse and for the permanent magnetization of the magnet device 9. The respective other electrical coil 11, 10 can be used for the modulation of the presently acting magnetic field.

Figure 6:
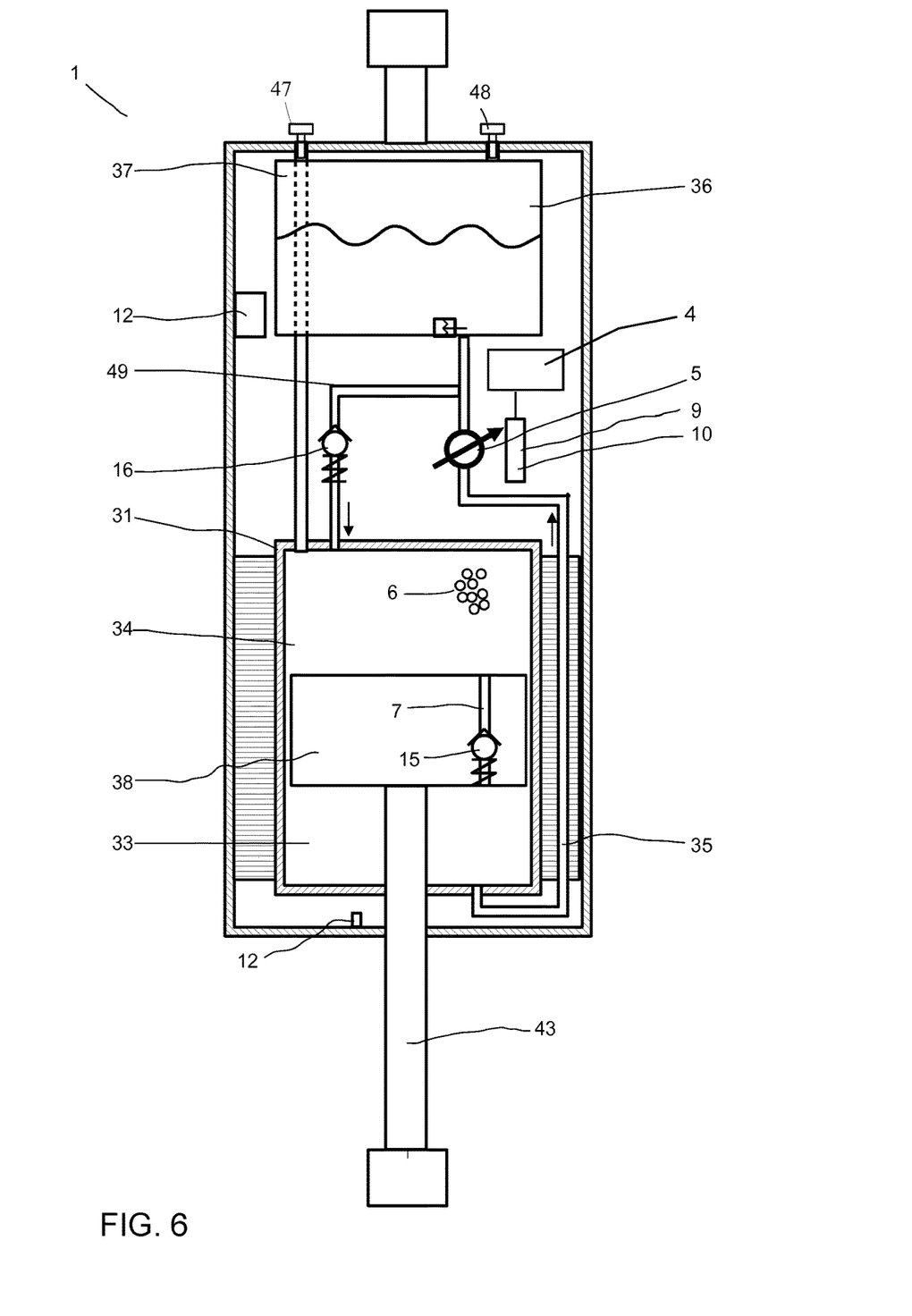
FIG. 6 shows a yet further embodiment of a door component according to the invention.

FIG. 6 shows another schematically illustrated variant of a damper device 1 of a door component 50 with connector units 51 and 52. The damper device 1 has a magnetorheological fluid 6 as working fluid. A piston unit 30 with a piston 38 separates a first chamber 33 from the second chamber 34. At least one flow channel 7 leads through the piston. The one-way valve 15 opens for the flow of the magnetorheological fluid from the second chamber 34 into the first chamber 33. From there, the working fluid is conducted through the return channel 35 to the in this case external damping valve 5, which is assigned a magnet device 9 and an electrical coil 10, in order to set the desired damping. The damping valve 5 is in turn connected in terms of flow to the second chamber 34 via a second one-way valve 16.

Both during the plunging of the piston rod 43 into the cylinder unit 31 and during the deployment of the piston rod 43 out of the cylinder unit 31, the working fluid 6 flows in the same direction along the indicated arrows. Depending on whether the piston rod is plunged in or deployed out, magnetorheological fluid is fed to the compensation chamber 37 or magnetorheological fluid is removed from the compensation chamber 37. In the compensation chamber 37, there is provided a compensation volume 36, which is filled with a gas.

One or more sensor devices 12 may be provided in order to detect a relative position of the two connector units 51 and 52 with respect to one another, in order to derive an angular position of the door 53 therefrom. In all embodiments, it is however also possible for other angle sensors to be provided, for example at the rotary joint, such that an angular position is directly output.

In this case, too, an electrical coil 10 is used for the generation of a magnetic pulse and for the permanent magnetization of the magnet device 9. The same or another electrical coil may be used for the modulation of the presently acting magnetic field.

Figure 7:
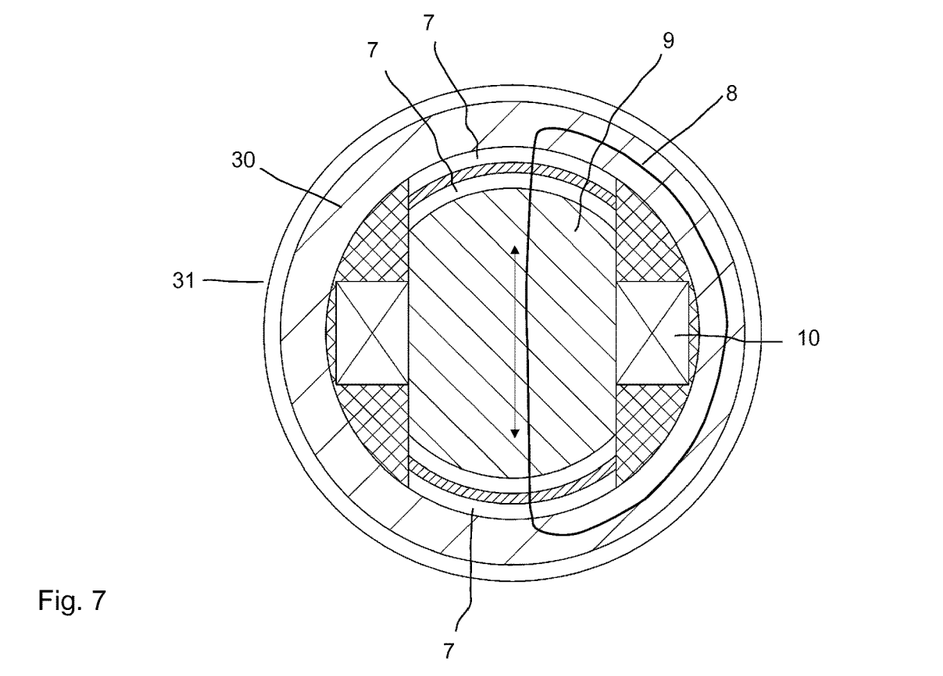
FIG. 7 shows a schematic cross section through a damping valve of a door component according to the invention.

FIG. 7 shows a schematic cross section through the cylinder unit 31 and the piston 38 arranged therein. It is possible to see clearly the flow channels 7 of the damping valve 5, which are in this case each divided further into 2 sub-channels by means of a partition. Also shown is a magnetic field line of the magnetic field 8. The magnetic field passes approximately perpendicularly through the flow channels 7 of the damping valve. The electrical coil 10 serves for the generation of a variable magnetic field, and in particular also for outputting a magnetic pulse in order to magnetize the magnet device 9 as desired.

It is correspondingly also possible, as illustrated in section in FIG. 7, for an external damping valve for the door component, for example, to be designed as per FIG. 6. All of the parts shown are then preferably immovable relative to one another. The flow channels 7 of the damping valve 5 may each be divided into two sub-channels by means of a partition. In this case, too, the magnetic field again passes approximately perpendicularly through the flow channels 7 of the damping valve 5. The electrical coil 10 serves for generating a variable magnetic field and may in particular also be used for outputting a magnetic pulse in order to permanently magnetize the magnet device 9 as desired.

Figure 8:
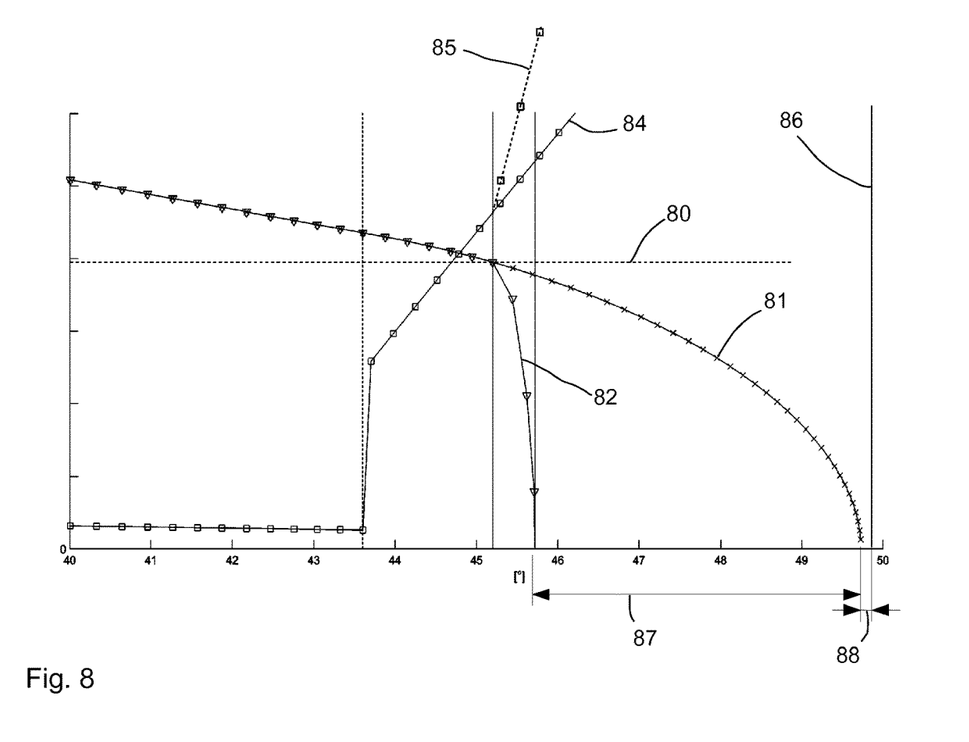
FIG. 8 shows a diagram with the speed and the deceleration of a door during a closing process.

FIG. 8 shows an exemplary diagram of the mode of operation during an opening process of a door. Normalized values for speed and deceleration are plotted versus the angle. The illustration shows the profiles of an uncontrolled speed 81 and the associated uncontrolled deceleration 84, and the profiles of the controlled speed 82 and the associated controlled deceleration 85, versus an opening angle.

Also plotted is a threshold value 80 for a threshold acceleration or a threshold deceleration. The threshold value 80 is predefined, but can be set and changed. If an actual deceleration exceeds the threshold value 80, then an acute hazard situation is identified, and hazard damping is triggered. This means in this case that the door movement is thereafter damped with a maximum damping action.

Here, at an angle of close to 44°, the door strikes a previously unidentified or unknown obstruction, which subsequently brakes the door movement. The present deceleration of the door thereupon exceeds the predefined threshold value 80 at an angle of close to 45°.

A certain length of time passes before a reliable value for the present deceleration is determined. In the intervening time, the door has moved further and reaches an angle of slightly greater than 45°.

As a result of the exceedance of the threshold value 80, it can be identified that it is not a normal and interference-free opening process that is being performed here. If no countermeasures were implemented here, the speed profile 81 and the acceleration profile 84 versus the angle would arise, and the door would come to a standstill for the first time at an opening angle of, for example, close to 50°. Permanent damage to the door (or to a neighbouring vehicle) or the like could already occur as a result.

By contrast, with the invention, as soon as possible or directly after the exceedance of the threshold value, the door is braked by means of the damper device, and in particular braked as intensely as possible. The door is braked because it is assumed that the door has struck or is striking an obstruction. Here, in general, the outer panel of the door initially bends elastically, such that additional braking of the door can possibly entirely prevent lasting damage to the door or to other objects.

If the door strikes a person, the person may be injured. Therefore, braking of the door is very much expedient and necessary in such situations.

As a result of the impact against the obstruction, the deceleration has abruptly increased, and increases further. Without further measures, the uncontrolled profile of the deceleration 84 would arise. Since the door is however braked to the maximum extent after the exceedance of the threshold value 80, the controlled profile of the deceleration 85 and the controlled speed profile 82 arise.

The door is braked with considerably greater intensity, and in this example comes to a standstill at an angle of close to 46°.

The hazard damping has brought the door (without near-field detection!) to a standstill earlier by an angular value 87 of approximately 4°. The angular value 87 is a direct measure for the absorbed energy and thus also reduction of the hazard. The stated numerical values are to be understood merely as examples and are merely initial values from tests. The values that can actually be achieved are dependent on numerous factors.

The control may be performed entirely by means of the position sensor or the angle sensor of the damper device 1. Other values need not be incorporated though may be used.

The invention can likewise be used highly advantageously during the closing of the door. For this purpose, it is merely necessary to imagine the diagram from FIG. 8 as having been horizontally mirrored. If, during the closing process, the door strikes for example a body part of a user, the deceleration of the door immediately increases intensely. The door is subsequently damped to the maximum extent and thus comes to a standstill considerably earlier, such that bruising of body parts or damage to objects can be reduced or prevented.

It is also possible and preferred for the door to be brought to a standstill at a particular small opening angle during every closing process, for example at 2.5° or at 3°, in order to prevent trapping of fingers.

The invention is also used for bringing the door smoothly to a standstill in targeted fashion at certain settable or selectable points or positions. For this purpose, the door movement is correspondingly damped in an adapted manner before the desired position is reached.

If surroundings sensors or a near-field detection facility is active, or if an obstruction 86 is known, the door movement is controlled such that the door comes to a standstill for example at the angular distance 88 before the obstruction, and is fixed there.

LIST OF REFERENCE DESIGNATIONS

1 Damper device
2 Closed position
3 Open position
4 Control device
5 Damping valve
6 MRF
7 Flow channel
8 Magnetic field
9 Magnet device
10 Electrical coil
11 Electrical coil
12 Sensor device
13 Angular position
14 Predetermined angular position
15 First one-way valve
16 Second one-way valve
18 Magnetic pulse
19 Time period
20 Rate of change
21 Delay
22 Rotational speed
23 Limit value of 20
24 Relatively low damping
25 Relatively high damping
26 Maximum damping
27 Damping
28 Closing speed
29 Second compensation channel
30 Piston unit
31 Cylinder unit
32 Cylinder volume
33 First chamber
34 Second chamber
35 Return channel
36 Compensation volume
37 Compensation chamber
38 Piston
39 Compensation device
10 Electrical connector unit
41 Connection cable
42 Slot
43 First piston rod
44 Second piston rod
45 Diameter of 43
46 Tube
50 Door component
51 Connector unit
52 Connector unit
53 Door
54 Angular position
60 Obstruction
80 Threshold value
81 Speed
82 Controlled speed
84 Deceleration
85 Controlled deceleration
86 Obstruction
87 Angular value
88 Distance
100 Vehicle
101 Supporting structure

The invention claimed is:

1. A method of damping a movement of a door device having a damper device with an adjustable and controllable damping action, the method which comprises:
   damping a movement of the door device by controlling a degree of damping at least partially between a closed position and an open position;
   determining a measure of a rate of change of a movement speed of the door device; and
   when the rate of change exceeds a predetermined threshold value, switching from a currently set, relatively low degree of damping to a relatively high degree of damping.

2. The method according to claim 1, which comprises setting the degree of damping to a substantially maximum value if the rate of change, being a deceleration, overshoots the predetermined threshold value.

3. The method according to claim 1, which comprises determining a measure for a position and/or an angular position of the door device.

4. The method according to claim 3, which comprises increasing the degree of damping when the door device approaches a predetermined angular position.

5. The method according to claim 4, which comprises increasing the degree of damping when the door device approaches the closed position.

6. The method according to claim 3, which comprises increasing the degree of damping to thereby decrease a rotational speed of the door device to a predefined closing speed.

7. The method according to claim 1, which comprises evaluating closing speeds during closing processes with an integrated learning function to thereby adapt the predefined closing speed to enable a reliable closing of the door device.

8. The method according to claim 1, which comprises increasing the degree of damping when the door device approaches a maximum open position.

9. The method according to claim 1, which comprises increasing the degree of damping only if a rotational speed of the door device overshoots a predefined rotational speed.

10. The method according to claim 1, which comprises increasing the degree of damping if an obstruction is identified in a movement path of the door device and a collision with the obstruction is imminent.

11. The method according to claim 1, which comprises controlling the damper device to cause a rotational speed of the door device to adopt a profile such that a quiet closure of the door device is achieved and/or that a particular opening angle is attained without abrupt changes in speed.

12. The method according to claim 1, configured for controlling a closing and opening of a vehicle door.

13. A door component, comprising:
two connector units movably disposed relative to one another, said connector units including a first connector unit connectable to a supporting structure and a second connector unit connectable to a movable door device;
at least one controllable damper device and a control device connected to said at least one controllable damper device and configured to dampen, under control by said control device, a movement of the door device at least partially between a closed position and an open position;
a sensor device connected to said control device for detecting a position of a pivotable said door device;
said control device being configured to determine a characteristic value for a rate of change of a speed of the door device using sensor data from said sensor device, and to switch said damper device from a relatively low degree of damping to a relatively high degree of damping if a rate of change of the speed of the door device exceeds a predefined threshold value.

14. The door component according to claim 13, wherein said damper device is a magnetorheological damper device, and wherein the degree of damping is adjustable by subjecting a magnetorheological fluid to a variable magnetic field.

15. The door component according to claim 13, wherein a time duration for switching from the relatively low degree of damping to the relatively high degree of damping is less than 50 ms.

16. The door component according to claim 13, wherein the degree of damping is set to a maximum value if the rate of change, being a deceleration of a movement of the door device, overshoots the predetermined threshold value.

17. The door component according to claim 13, wherein the degree of damping is deactivated, or is reduced to a low value, when the speed of the door device or a rotational speed of the door device has decreased to zero.

18. The door component according to claim 14, wherein the damper device is formed with at least one flow channel through which the magnetorheological fluid can flow, wherein said flow channel can be subjected to the variable magnetic field to thereby adjust a flow resistance in said flow channel, and wherein a resultant degree of damping of said damper device is set to a more intense value by way of a relatively intense magnetic field in said flow channel and to a relatively weak value by way of a relatively weak magnetic field.

19. The door component according to claim 13 configured for a door of a vehicle.

* * * * *